US008314939B2

(12) United States Patent
Kato (10) Patent No.: US 8,314,939 B2
(45) Date of Patent: Nov. 20, 2012

(54) REFERENCE SPHERE DETECTING DEVICE, REFERENCE SPHERE POSITION DETECTING DEVICE, AND THREE-DIMENSIONAL-COORDINATE MEASURING DEVICE

(75) Inventor: Kinya Kato, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/873,506

(22) Filed: Sep. 1, 2010

(65) Prior Publication Data
US 2011/0013200 A1    Jan. 20, 2011

Related U.S. Application Data

(63) Continuation of application No. PCT/JP2009/054404, filed on Mar. 9, 2009.

(30) Foreign Application Priority Data

Mar. 11, 2008   (JP) ................................ 2008-060605

(51) Int. Cl.
*G01B 11/24*   (2006.01)
(52) U.S. Cl. ........................................ 356/608; 356/622
(58) Field of Classification Search .......... 356/601–623, 356/124–127; 359/381, 820
See application file for complete search history.

(56) References Cited

U.S. PATENT DOCUMENTS

| RE33,774 | E | * | 12/1991 | Gurny | .............................. | 33/503 |
| 5,106,183 | A | * | 4/1992 | Yoder, Jr. | ....................... | 351/212 |
| 5,369,488 | A | * | 11/1994 | Morokuma | ..................... | 356/493 |
| 5,424,834 | A | * | 6/1995 | Akedo et al. | .................. | 356/609 |
| 5,463,430 | A | | 10/1995 | Isogai et al. | | |
| 5,548,396 | A | * | 8/1996 | Morita et al. | .................. | 356/127 |

(Continued)

FOREIGN PATENT DOCUMENTS

JP    6-46999    2/1994

(Continued)

OTHER PUBLICATIONS

PCT International Search Report mailed May 19, 2009, for corresponding PCT Application No. PCT/JP2009/054404.

*Primary Examiner* — Hoa Pham
(74) *Attorney, Agent, or Firm* — Staas & Halsey LLP (57) ABSTRACT

A reference sphere detecting device used for a reference sphere position detecting device comprises an optical unit having a laser light source, a collective lens for collecting light from the laser light source and irradiating the light to a reference sphere positioned at or near a front focal position, a first image pickup device for receiving and detecting reflected light from the reference sphere, the first image pickup device being disposed at a rear focal position of the collective lens; driving units for rotationally moving the optical unit about a reference point; and a control unit for controlling the driving units on the basis of the position at which the reflected light is received and rotationally moving the optical unit so that the reflected light reaches a predetermined reference position of the first image pickup device.

23 Claims, 4 Drawing Sheets

U.S. PATENT DOCUMENTS

| | | | |
|---|---|---|---|
| 5,781,294 A * | 7/1998 | Nakata et al. | 356/487 |
| 5,805,287 A | 9/1998 | Pettersen et al. | |
| 5,886,813 A * | 3/1999 | Nagasawa | 359/383 |
| 6,008,901 A * | 12/1999 | Ohtsuka | 356/489 |
| 6,392,795 B2 * | 5/2002 | Okada | 359/368 |
| 6,870,605 B2 * | 3/2005 | Osawa et al. | 356/4.09 |
| 2002/0041381 A1 * | 4/2002 | Akishiba | 356/638 |
| 2003/0227616 A1 * | 12/2003 | Bridges | 356/139.06 |
| 2006/0152799 A1 * | 7/2006 | Ri | 359/368 |
| 2008/0043323 A1 * | 2/2008 | Fukuyama et al. | 359/368 |

FOREIGN PATENT DOCUMENTS

| | | | |
|---|---|---|---|
| JP | 8-510835 | | 11/1996 |
| JP | 2000-275027 | | 10/2000 |
| JP | 2003-130642 | | 5/2003 |
| JP | 2005-43203 | | 2/2005 |
| JP | 2006-90744 | | 4/2006 |
| JP | 2007-85914 | | 4/2007 |
| JP | 2007-120993 A | * | 5/2007 |
| JP | 2007-130398 | | 5/2007 |

* cited by examiner

REFERENCE SPHERE DETECTING DEVICE, REFERENCE SPHERE POSITION DETECTING DEVICE, AND THREE-DIMENSIONAL-COORDINATE MEASURING DEVICE

CROSS REFERENCE TO RELATED APPLICATIONS

This is a continuation of PCT International Application No. PCT/JP2009/054404, filed on Mar. 9, 2009, which is hereby incorporated by reference. This application also claims the benefit of Japanese Patent Application No. 2008-060605, filed in Japan on Mar. 11, 2008, which is hereby incorporated by reference.

BACKGROUND

1. Field

The present invention relates to a reference sphere detecting device, to a reference sphere position detecting device provided with the reference sphere detecting device, and to a three-dimensional-coordinate measuring device provided with the reference sphere position detecting device.

2. Description of Related Art

There has recently been increased demand for measurement of the three-dimensional shape of objects through the use of various sensors (non-contact sensors). These sensors are attached to a mechanism that can be controlled in five or six axes so as to be able to move parallel to and rotate about each of the x, y, and z axes. There have been numerous examples of techniques in which sensors for measuring the three-dimensional shape of a measured object are attached to a robotic arm, and the shape is measured from various positions and angles. Particularly in a case in which a sensor is attached to a robotic arm, unless data are associated based on an accurate assessment of the position and orientation of the sensor, the three-dimensional shape cannot be ascertained with high precision. As an example of such a case, a device has been disclosed in which a plurality of cameras capable of imaging in the entire range of movement of a sensor is used to measure the position and orientation of the sensor by analyzing the images of each camera (stereo photography method) (see Patent Document 1, for example).

Patent Document 1: Japanese Laid-Open Patent Publication No. H8-51083 based on PCT International Application No. PCT/NO94/00096

SUMMARY

Various embodiments of the present invention provide reference object detecting device including (a) an optical unit including a collective lens which collects light from a moving reference object, and an acceptance unit which receives the collected light via the collective lens; (b) a driving unit which rotationally moves the optical unit about a reference point; and (c) a control unit which controls the driving unit to rotationally move the optical unit on the basis of a position where the collected light is received on the acceptance unit.

Various embodiments of the present invention also provide an apparatus including (a) an optical unit including a light source which emits a light, a collective lens which irradiates the emitted light toward a substantially spherical surface so that the emitted light reflects off the substantially spherical surface and which collects the reflected light, and an acceptance unit which receives the collected light; and (b) a control unit which calculates an offset of the emitted light from an optical axis of the emitted light that would cause the emitted light to pass through a center of a sphere having the substantially spherical surface, and causes the optical unit to be moved to adjust for the calculated offset.

In various embodiments, the control unit causes the optical unit to be moved to adjust for the offset so that the collected light is received at a center point of the acceptance unit.

Moreover, in various embodiments, the substantially spherical surface is a surface of a moving reference object attached to an object to be measured.

The above described embodiments are only examples of embodiments of the present invention, and all embodiments of the present invention are not limited to including the features in these examples.

EXPLANATION OF NUMERALS AND CHARACTERS

1: laser (light source)
3, 33: half mirrors
4: dichroic mirror
5: lens
6, 16, 26: reference spheres
8: acceptance unit (first image pickup device)
9: lens
10: image acceptance unit (second image pickup device)
31: shutter
32: reference mirror
34: coherent-light acceptance unit
60: control unit
100: reference sphere detecting device
200: reference sphere position detecting device Description of Embodiments In order to achieve even higher precision with the conventional method such as described in the Description of Related Art, above, the pixel size must be reduced, and it is necessary to take such measures as increasing the number of pixels in the cameras or narrowing the range of movement (narrowing the field of view) of the sensor. Increasing the number of pixels has drawbacks in that there is a limit to the number of pixels (4,000×4,000=16,000,000), and narrowing the range of movement of the sensor has drawbacks in that the specifications of the device are adversely affected.

Various embodiments of the present invention were developed in view of such problems, and an aspect of various embodiments of the present invention is to provide a reference sphere detecting device whereby high measurement precision and wide measurement range can be achieved at the same time, a reference sphere position detecting device provided with the reference sphere detecting device, and a threedimensional-coordinate measuring device provided with the reference sphere position detecting device.

(Reference Sphere Detecting Device)

Figure 1:
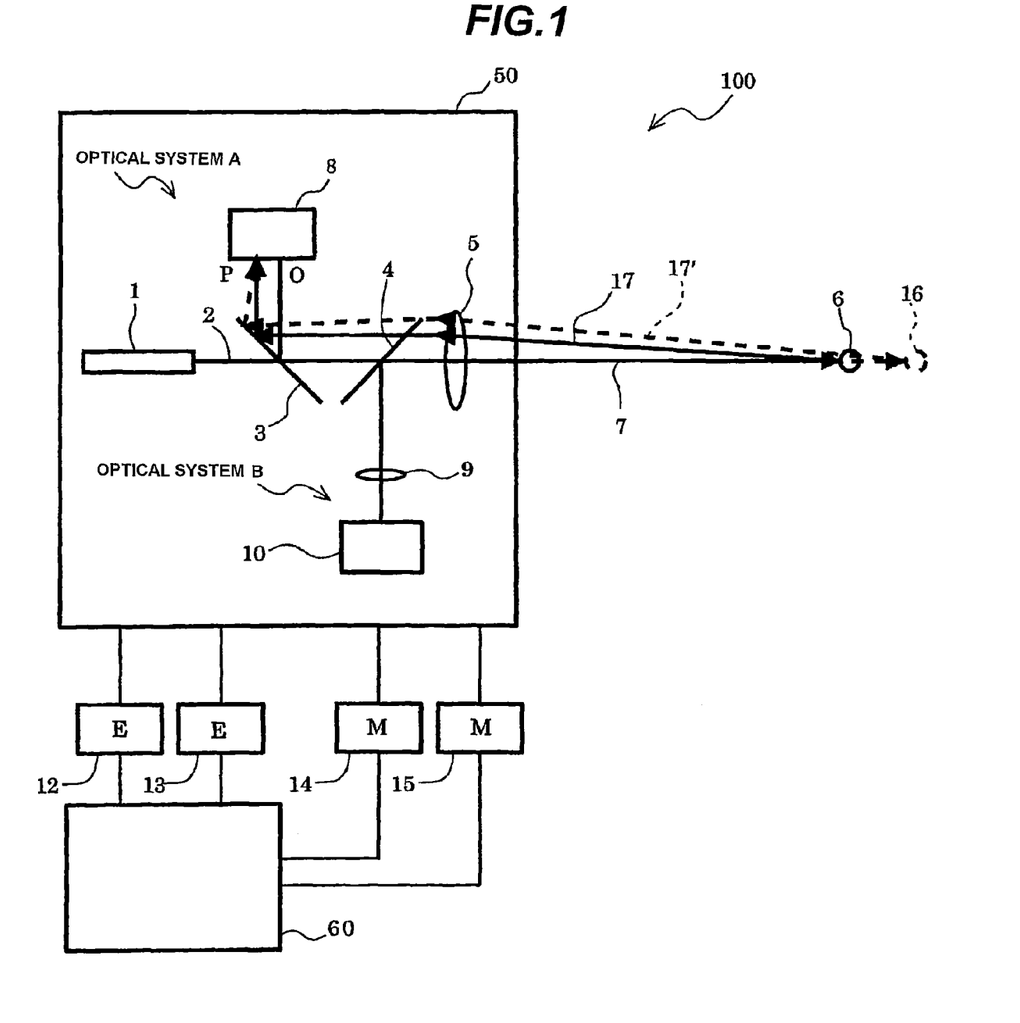
FIG. 1 is a view showing the structure of the reference sphere detecting device according to an embodiment of the present invention.

Various embodiments of the present invention will be described with reference to the drawings. The reference sphere detecting device 100 will first be described using FIG. 1. As shown in FIG. 1, the reference sphere detecting device 100 is composed of an optical unit 50 for detecting a position in relation to a reference sphere 6 by irradiating a laser beam 2 toward the reference sphere 6 and receiving reflected light 7 reflected by the reference sphere 6; angle detectors 12, 13 (e.g.; rotary encoders or the like) for detecting the azimuth angle and elevation angle, respectively, of the optical unit 50; driving units 14, 15 (e.g., stepping motors, hydraulic cylinders, or the like) for rotationally moving the optical unit 50 in the horizontal direction and the vertical direction, respectively; and a control unit 60 for controlling the operation of the entire reference sphere detecting device 100.

The optical unit 50 has a laser light source 1 for emitting the laser beam 2 to the reference sphere 6; and a half mirror 3 disposed on the optical path of the laser beam 2, a dichroic mirror 4, and a collective lens 5 for collecting the laser beam 2 are arranged in sequence from the laser light source 1 in the optical unit 50. In this arrangement, the optical unit 50 is disposed so that the center of the reference sphere 6 is positioned at or near the front focal position of the collective lens 5. The optical unit 50 also has a first image pickup device 8 (e.g., CCD, CMOS, or the like) as an acceptance unit for receiving the reflected light 7 reflected by the reference sphere 6, and the first image pickup device 8 is disposed to the side of the half mirror 3. Here, the first image pickup device 8 is disposed at or near the rear focal position of the collective lens 5 (this optical system will be referred to hereinbelow as the "tracking optical system A"). The optical unit 50 is also provided with an imaging lens 9 and a second image pickup device 10 (e.g., CCD, CMOS, or the like) arranged in sequence from the dichroic mirror 4 and disposed to one side of the dichroic mirror 4, and the ray (e.g., visible light) reflected by the reference sphere 6 is reflected by the dichroic mirror 4 and detected by the second image pickup device 10 (this optical system will be referred to hereinbelow as the "rough alignment optical system B").

In a case in which a semiconductor laser is used as the laser light source 1, a collimator lens (not shown) is provided to the laser light source 1.

The reference sphere 6 has a spherical surface, and the surface facing the tracking optical system A may be convex or concave, but a convex surface is preferred. An at least hemispherical body having a convex surface facing the tracking optical system A is more preferred, and a complete sphere is most preferred. A reference sphere 6 having such a shape is preferred because the diameter thereof can be accurately and easily measured using a micrometer caliper or other measuring tool, and the center position of the reference sphere 6 can be detected with high precision.

The process of reference sphere detection by the reference sphere detecting device 100 will now be described. The laser beam 2 emitted from the laser light source 1 is transmitted through the half mirror 3 and the dichroic mirror 4 as a parallel luminous flux, and is collected near the center of the reference sphere 6 by the collective lens 5. At this time, the numerical aperture (NA) of the collective lens 5 is preferably smaller than 0.002 for the sake of depth of focus. Given a wavelength λ of 0.6 μm, the depth of focus is $\pm \lambda/2NA^2$, and is therefore ±75 mm.

Figure 2:
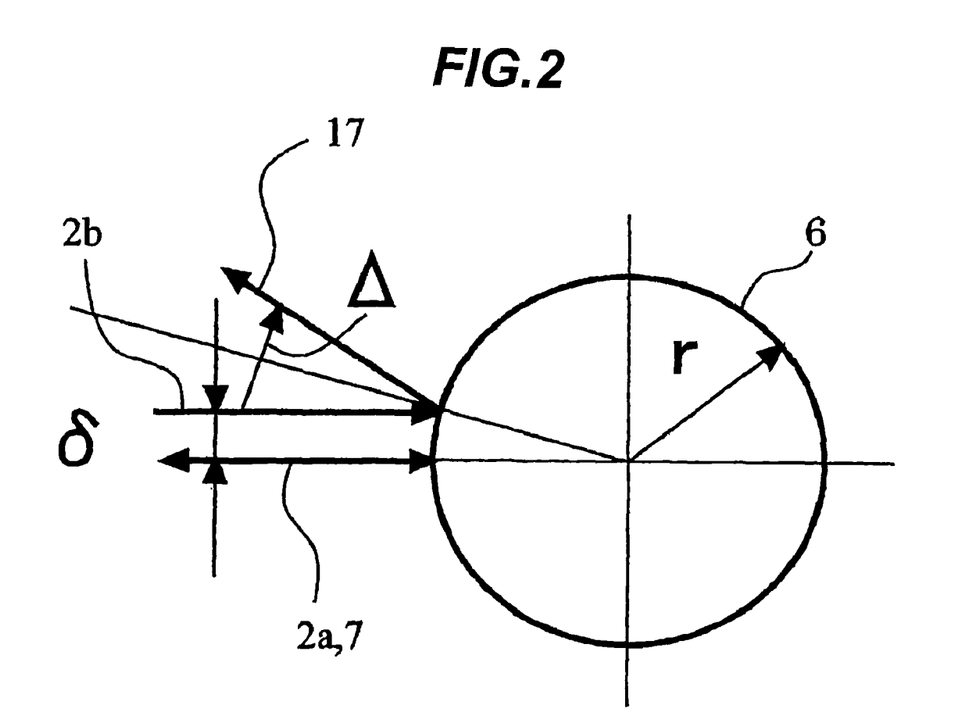
FIG. 2 is a view showing the underlying principle of the reflection direction at the reference sphere with respect to the incidence position of the laser beam.

The direction in which the laser beam 2 irradiated to the reference sphere 6 is reflected will be described using FIG. 2.

Since the reference sphere 6 is a perfect sphere having a polished surface, when the laser beam 2 is incident so as to pass through the center of the reference sphere 6 (as the laser beam 2a in FIG. 2), the reflected light 7 is reflected in the incidence direction along the optical axis. In contrast, when the optical axis through the center of the reference sphere 6 and the center axis of the laser beam 2 are offset by an amount δ (as the laser beam 2b in FIG. 2), the reflected light 17 is reflected in a different direction from the incidence direction. The angle of deflection Δ of the reflected light 17 is found by using Equation (1) below, where r is the radius of the reference sphere 6.

$$\Delta = 2\delta/r \quad (1)$$

The reflected light 7, 17 reflected by the reference sphere 6 is transmitted through the dichroic mirror 4 and reflected by the half mirror 3, before reaching the first image pickup device 8. In a case in which the tracking optical system A is configured so that the reflected light 7 in the case in which the laser beam 2 passes through the center of the reference sphere 6, as indicated by the laser beam 2a, reaches a point O (reference point) at the center of the first image pickup device 8, the reflected light 17 in the case in which the laser beam 2 is offset from the center of the reference sphere 6, as indicated by the laser beam 2b, reaches a point P (acceptance point) offset from the point O of the first image pickup device 8. For example, in a case in which the radius r of the reference sphere is 5 mm and the offset amount δ=1 μm, the angle of deflection Δ calculated by Equation (1) is approximately 83 seconds. When the focal length of the collective lens 5 is 100 mm, the reflected light 17 reaches a position (point P) that is 83 seconds×100 mm=40 μm offset from the point O on the first image pickup device 8. Therefore, through a configuration such as the one described above, even when the offset amount 5 with respect to the reference sphere 6 is 1 μm, the offset can be adequately detected when the resolution of the first image pickup device 8 is considered. pan Consequently, in order for the laser beam 2 to strike the center of the reference sphere 6, the direction of the optical unit 50 (direction of the tracking optical system A) is controlled by the control unit 60 on the basis of the value obtained by Equation (1) so that the reflected light 17 reaches the center point O (reference point) of the first image pickup device 8, i.e., so that the reflected light 17 coincides with the reflected light 7. Specifically, the control unit 60 rotationally moves the optical unit 50 in the horizontal direction or the vertical direction about the reference point of the optical unit 50 by using the driving units 14, 15 so that the reflected light 17 reaches the center point O of the first image pickup device 8.

As described hereinafter, the measurement values of the angle detectors 12, 13 obtained after this positioning with respect to the point O are the azimuth angle and elevation angle of the center direction of the reference sphere 6 from the initial position of the tracking optical system A. The three-dimensional center coordinates of the reference sphere 6 may be measured by preparing at least two of the reference sphere detecting device 100 (tracker) described above and measuring the azimuth angle from the optical system of each reference sphere detecting device 100 to the center of the reference sphere 6 (this process is described in detail hereinafter).

A case will next be considered in which the reference sphere 6 is at the position of the reference sphere 16 indicated by the dashed line in FIG. 1. The angle of deflection in a case in which the laser beam 2 and the center of the reference sphere 6 are not aligned is determined by Equation (1) described above. The reflected light 17' in this case is therefore parallel to the reflected light 17 when the laser beam 2 is incident being offset by the amount 5 from the optical axis passing through the center of the reference sphere 6. By the offsetting of the reference sphere 6 to the position of the reference sphere 16, in a case in which the center of the reference sphere 16 and the optical axis of the laser beam 2 are offset by the amount δ as described above using FIG. 2, the first image pickup device 8 is at the rear focal position of the collective lens 5, and the reflected ray 17' therefore reaches the point P on the first image pickup device 8. Specifically, since the point reached by the reflected rays 17, 17' on the first image pickup device 8 is determined by the offset amount δ of the laser beam 2 with respect to the center of the reference spheres 6, 16 regardless of the positions of the reference spheres 6, 16, the azimuth of the tracking optical system A with respect to the reference sphere 16 can be finely adjusted from the acceptance position P on the first image pickup device 8, and the angle offset with respect to the reference sphere 16 can be calculated.

A laser light source 1 was used as the light source in the above description, but a configuration may also be adopted in which a pinhole is illuminated by an LED or other light source, and the light is converted to a parallel luminous flux.

In the rough alignment optical system B, a low-magnification optical system is formed by the collective lens 5 and the imaging lens 9. Through this rough alignment optical B that is a low-magnification optical system, the reference sphere 16 can obtain an image of the reference sphere 6 by using the second image pickup device 10 and use the obtained image to adjust (rough adjustment) the azimuth of the optical unit 50. Specifically, by adopting a configuration in which the image of the reference sphere 6 is detected by pattern recognition or the like performed by the control unit 60 for the image detected by the second image pickup device 10, and the reflected light 7, 17 is incident near the center O of the first image pickup device 8 when the image of the reference sphere 6 is at a predetermined position (e.g., the center) of the second image pickup device 10, when the reference sphere 6 cannot be tracked by the tracking optical system A, the control unit 60 can position the optical unit 50 with respect to the reference sphere 6 by controlling the direction of the optical unit 50 by using the rough alignment optical system B.

For example, during startup of the reference sphere detecting device 100, the azimuth of the optical unit 50 as a whole can be roughly adjusted by using the rough alignment optical system B to align the optical unit 50 by using the image of the reference sphere 6 on the image pickup device 10. After this rough adjustment, the reference sphere 6 can be efficiently detected by finely adjusting the azimuth of the optical unit 50 so that the reflected ray on the first image pickup device 8 in the tracking optical system A reaches the reference position.

An appropriate illumination system is added if needed in order to obtain an image, but adaptation must be made so that the reflected light of the illumination system from the spherical surface of the reference sphere 6 does not directly enter the first image pickup device 8. In this case, since the rough alignment optical system B is separated from the tracking optical system A by the dichroic mirror 4, a wavelength region (e.g., visible light) different from that of the wavelength of the tracking optical system A, i.e., the wavelength of the laser beam 2 emitted from the laser light source 1, is used.
(Reference Sphere Position Detecting Device)

Figure 3:
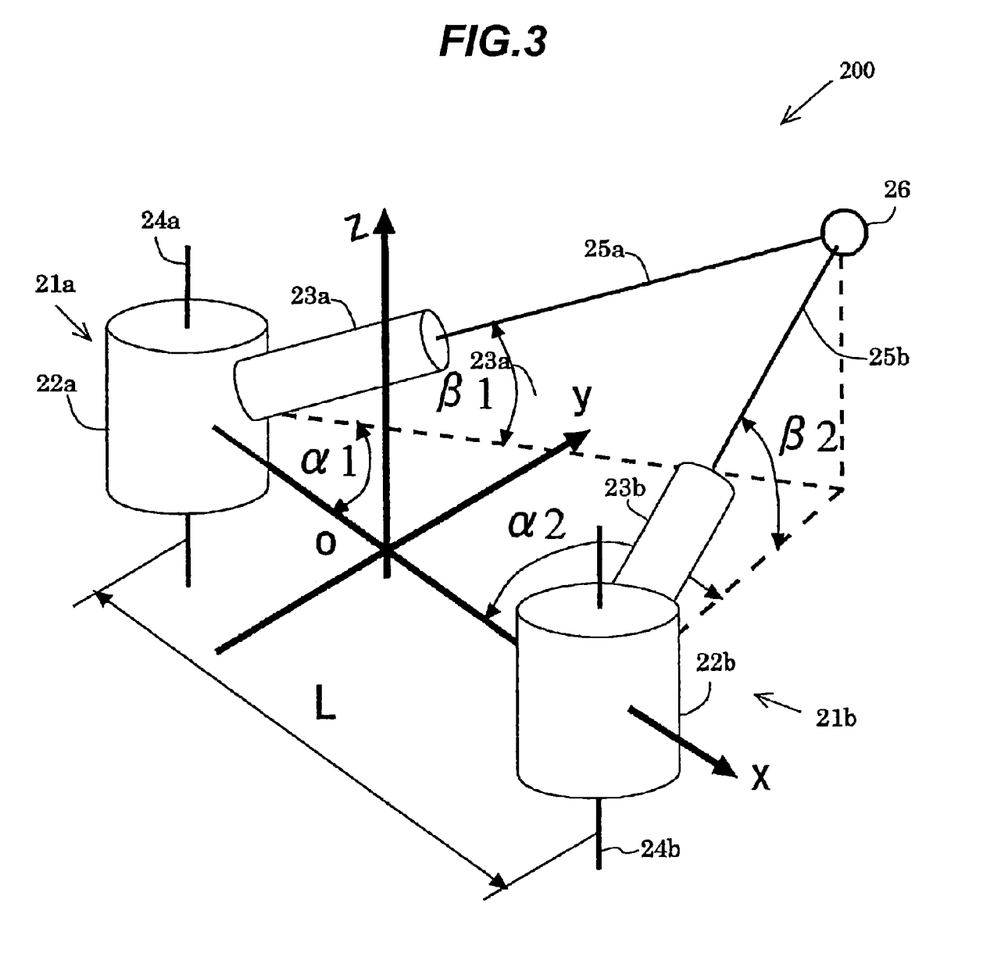
FIG. 3 is a view showing the concept of the reference sphere position detecting device according to an embodiment of the present invention.

FIG. 3 is a conceptual view showing the reference sphere position detecting device 200 in which two of the reference sphere detecting device 100 (referred to below as a tracker) described above are used. Through the use of driving means (corresponding to 14 and 15 in FIG. 1) not shown in the drawing, the two trackers 21a, 21b can be rotated (in the horizontal direction) about the rotational axes 24a, 24b of main bodies 22a, 22b, lens barrels 23a, 23b can be rotated (in the vertical direction) in the perpendicular direction about the intersection points (reference point of the optical unit 50 described above) of lens barrel axes 25a, 25b and rotational axes 24a, 24b, and the azimuth angles ($\alpha_1$, $\alpha_2$) and elevation angles ($\beta_1$, $\beta_2$) with respect to the center of a reference sphere 26 from the trackers 21a, 21b can each be measured by rotary encoders or other angle detectors (corresponding to 12 and 13 in FIG. 1) not shown in the drawing. Here, the positional relationship of the trackers 21a, 21b to each other is known, the height positions (Z-axis direction in FIG. 1) thereof are equal, and the interval of the rotational axes 24a, 24b is designated as L. The center coordinates (x, y, z) of the reference sphere 26 can be calculated by using Equations (2) through (4) below, where the coordinate origin is the center between the intersections of the lens barrel axes 25a, 25b of the lens barrels 23a, 23b with the rotational axes 24a, 24b of the main bodies 22a, 22b.

$$x = L\sin(\alpha_2 - \alpha_1)/2\sin(\alpha_1 + \alpha_2) \quad (2)$$

$$y = L\sin\alpha_1 \sin\alpha_2/\sin(\alpha_1 + \alpha_2) \quad (3)$$

$$z = L\sin\alpha_2 \tan\beta_1/\sin(\alpha_1 + \alpha_2) \quad (4)$$
$$= L\sin\alpha_1 \tan\beta_2/\sin(\alpha_1 + \alpha_2)$$

A state in which the lens barrels 23a, 23b of the trackers 21a, 21b shown in FIG. 3 are facing each other, and the laser beams (corresponding to 2 in FIG. 1) of each tracker reach the center (corresponding to point O in FIG. 1) of the image pickup device (corresponding to 8 in FIG. 1) of the other tracker so as to be in a straight line represents the origin (0 reference) of the azimuth angles $\alpha_1$, $\alpha_2$ and elevation angles $\beta_1$, $\beta_2$ in Equations (2) through (4). As a different method of determining the angle reference, a sphere having a fixed position and known spatial coordinates (different from the reference sphere 26; preferably a plurality of spheres) may be used as a reference.
(Three-Dimensional-Coordinate Measuring Device)

A three-dimensional-coordinate measuring device that uses a plurality of the reference sphere position detecting device 200 will be described. The three-dimensional-coordinate measuring device is provided with at least two, preferably three, of the reference sphere position detecting device 200. For example, a plurality of reference spheres 6 in a known positional relationship is attached to the external surface of a three-dimensional sensor, and the abovementioned reference sphere position detecting device 200 is provided to each of the reference spheres 6. The position (x, y, z) of each reference sphere 6 is detected by the corresponding reference sphere position detecting device 200. The position and orientation of the three-dimensional sensor can be measured based on the measured positions of the reference spheres 6.
(Incorporation of an Interferometer for Length Measurement)

Figure 4:
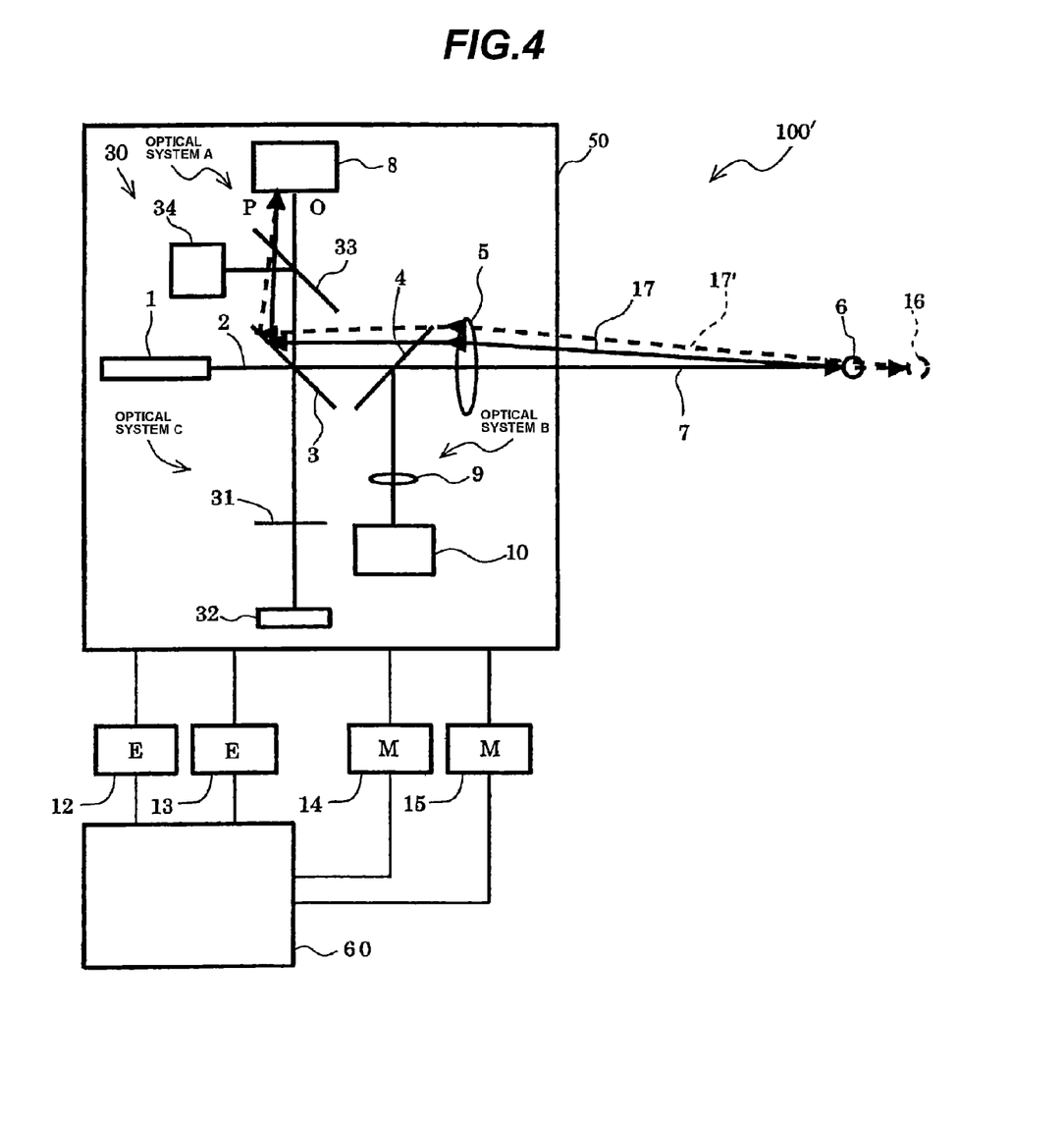
FIG. 4 is a view showing the structure of the reference sphere detecting device according to an embodiment of the present invention in a case in which an interference optical system for length measurement is provided thereto.

The reference sphere detecting device 100 described above may be adapted so as to be provided with a length-measurement interference optical system C such as the one shown in FIG. 4. In this reference sphere detecting device 100', a configuration is adopted in which the laser light source 1 is also used as the light source of the length-measurement interference optical system C, and the optical unit 50 as a whole is controlled so that the reflected ray 17 reaching the first image pickup device 8 always reaches the point O as the reference sphere 6 moves, as shown in FIG. 4. Through such a configuration, the reference sphere 6 can always be tracked, and the variation in distance to the surface of the reference sphere 6 can be accurately measured.

In the length-measurement interference optical system C, the laser light source 1, the half mirror 3, and the collective lens 5 are shared with the tracking optical system A, and a shutter 31 and a reference mirror 32 are provided in the stated order to the side of the half mirror 3 (on the opposite side from the first image pickup device 8). A half mirror 33 is provided between the half mirror 3 and the first image pickup device 8, and an acceptance element (coherent light acceptance unit) 34 for receiving the ray reflected by the half mirror 33 is also provided.

The shutter 31 opens in a case in which length is measured by using the length-measurement interference optical system C. A portion of the laser beam 2 emitted from the laser light source 1 is then transmitted through the half mirror 3 and reflected by the reference sphere 6 via the dichroic mirror 4 and the collective lens 5. The remainder of the laser beam 2 is reflected by the half mirror 3, passed by the shutter 31, and reflected by the reference mirror 32. A length-measuring beam reflected by the reference sphere 6 is reflected by the half mirror 3 and merged on the same optical path with a reference beam reflected by the reference mirror 32 and transmitted through the half mirror 3. The merged beam is reflected by the half mirror 33 as coherent light and received and detected by the acceptance element 34, and the distance variation of the reference sphere 6 can be detected by using the coherent light. The shutter 31 must be closed at times other than during length measurement (i.e., while the reference sphere 6 is stationary).

In accordance with the above, a reference sphere detecting device according to various embodiments comprises an optical unit having a light source, a collective lens for collecting light from the light source and irradiating the light to a reference sphere positioned at or near a front focal position, and an acceptance unit for receiving and detecting reflected light from the reference sphere, the acceptance unit being disposed at or near a rear focal position of the collective lens; a driving unit for rotationally moving the optical unit about a reference point; and a control unit for controlling the driving unit and rotationally moving the optical unit on the basis of the position at which the reflected light detected by the acceptance unit is received so that the reflected light reaches a predetermined reference position of the acceptance unit.

In such a reference sphere detecting device, preferably, the optical unit has an imaging lens and an image detector for detecting an image of the reference sphere imaged by the imaging lens; and the control unit controls the driving unit and rotationally moves the optical unit on the basis of the image of the reference sphere detected by the image detector so that the reflected light is incident on the acceptance unit.

In such a reference sphere detecting device, the driving unit is preferably configured so as to rotationally move the optical unit in the horizontal direction and the vertical direction.

Such a reference sphere detecting device also preferably comprises an angle detector for detecting the angle of the optical unit in the horizontal direction and the vertical direction.

In such a reference sphere detecting device, the optical unit preferably further comprises an interference optical system for length measurement.

A reference sphere position detecting device of various embodiments comprises two of the abovementioned reference sphere detecting devices separated via a predetermined interval, and is configured so as to measure three-dimensional coordinates of the center of the reference sphere on the basis of the predetermined interval and an azimuth angle and elevation angle measured by the two reference sphere detecting devices.

A three-dimensional-coordinate measuring device of various embodiments comprises at least two or more reference spheres attached to an external surface of a measured object; and at least two or more of the abovementioned reference sphere position detecting device so as to correspond to the reference spheres; wherein three-dimensional coordinates of the plurality of reference spheres are measured by each of the corresponding reference sphere position detecting devices, and the position and orientation of the measured object are detected based on values obtained by the measurements.

When the reference sphere detecting device, reference sphere position detecting device, and three-dimensional-coordinate measuring device according to various embodiments are configured as described above, a wide range of spatial coordinates can be measured with high precision.

Embodiments can be implemented using computing hardware (computing apparatus) and/or software, such as (in a non-limiting example) any computer that can store, retrieve, process and/or output data and/or communicate with other computers. A program/software implemented in various embodiments may be recorded on a non-transitory computer-readable medium. Examples of a non-transitory computer-readable medium include a magnetic recording apparatus, an optical disk, a magneto-optical disk, and/or a semiconductor memory (for example, RAM, ROM, etc.). Examples of a magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc—Read Only Memory), and a CD-R (Recordable)/RW.

The many features and advantages of the various embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

What is claimed is:

1. A reference object detecting device comprising:
an optical unit including a collective lens which collects light from a reference object without any optical element having power arranged between the reference object and the collective lens, and an image pickup unit arranged at or near a rear focal position of the collective lens;
a driving unit which rotationally moves the optical unit about a reference point; and
a control unit which controls the driving unit to rotationally move the optical unit, and thereby rotationally move both the collective lens and the image pickup unit, on the basis of a position where the collected light is received on the image pickup unit.

2. The reference object detecting device according to claim 1, wherein
the optical unit comprises a light source which emits light; and
the reference object is provided with a substantially spherical surface, and the light emitted by the light source is irradiated via the collective lens toward the substantially spherical surface and is thereby reflected from the substantially spherical surface and then collected by the collective lens as said collected light.

3. The reference object detecting device according to claim 2, wherein a focal length of the collective lens and a radius of the substantially spherical surface are determined based on resolution of the image pickup unit and a required detection precision relating to an amount of offset from a center of the substantially spherical surface.

4. The reference object detecting device according to claim 2, wherein the control unit controls the driving unit to rotationally move the optical unit to adjust for an offset of the emitted light from an optical axis of the emitted light that would cause the emitted light to pass through a center of a sphere having the substantially spherical surface.

5. The reference object detecting device according to claim 4, wherein the control unit controls the driving unit to rotationally move the optical unit to adjust for the offset so that the collected light is received at a center point of the image pickup unit.

6. The reference object detecting device according to claim 1, wherein the control unit controls the driving unit to rotationally move the optical unit to control the position where the collected light is received on the image pickup unit so that the collected light reaches a predetermined reference position on the image pickup unit.

7. The reference object detecting device according to claim 1, wherein
the optical unit has an imaging lens and an image detector which detects an image of the reference object imaged by the imaging lens; and
the control unit controls the driving unit to rotationally move the optical unit on the basis of the image of the reference object detected by the image detector so that the collected light is incident on the image pickup unit.

8. The reference object detecting device according to claim 1, wherein the driving unit is configured so as to rotationally move the optical unit in a horizontal direction and a vertical direction.

9. The reference object detecting device according to claim 1, comprising an angle detector which detects an angle of the optical unit in a horizontal direction and a vertical direction.

10. The reference object detecting device according to claim 1, wherein the optical unit further comprises an interference optical system for length measurement.

11. An apparatus comprising a first reference object detecting device according to claim 1 and a second reference object detecting device according to claim 1, wherein
the first and second reference object detecting devices are separated by a predetermined interval, and
the apparatus uses the first and second reference object detecting devices to measure three-dimensional coordinates of a center of a reference object based on the predetermined interval and an azimuth angle and an elevation angle measured by the first and second reference object detecting devices.

12. A three-dimensional-coordinate measuring device for measuring an object, comprising:
reference objects on the surface of the object; and
at least two or more apparatuses according to claim 11 so as to correspond, respectively, to the number of the reference objects,
wherein three-dimensional coordinates of centers of the reference objects are measured by the corresponding apparatus, respectively, and a position and orientation of the object to be measured is detected based on the measured three-dimensional coordinates.

13. The reference object detecting device according to claim 1, wherein the control unit controls the driving unit to rotationally move the optical unit so that the collected light is received at a center point of the image pickup unit.

14. An apparatus comprising:
an optical unit including a light source which emits a light, a collective lens which irradiates the emitted light toward a substantially spherical surface so that the emitted light reflects off the substantially spherical surface and which collects the reflected light, and an image pickup unit which receives the collected light; and
a control unit which calculates an offset of the emitted light from an optical axis of the emitted light that would cause the emitted light to pass through a center of a sphere having the substantially spherical surface, and causes the optical unit to be moved, and thereby causes the light source, the collective lens and the image pickup unit to be moved, to adjust for the calculated offset.

15. The apparatus according to claim 14, wherein the control unit causes the optical unit to be moved to adjust for the offset so that the collected light is received at a center point of the image pickup unit.

16. The apparatus according to claim 15, wherein the substantially spherical surface is a surface of a moving reference object.

17. The apparatus according to claim 14, wherein the substantially spherical surface is a surface of a moving reference object.

18. A reference object detecting device comprising:
an optical unit including a collective lens which collects light from a moving reference object, and an image pickup unit which receives the collected light via the collective lens;
a driving unit which rotationally moves the optical unit about a reference point; and
a control unit which controls the driving unit to rotationally move the optical unit, and thereby rotationally move both the collective lens and the image pickup unit, on the basis of a position where the collected light is received on the image pickup unit, wherein
the optical unit has an imaging lens and an image detector which detects an image of the reference object imaged by the imaging lens, and
the control unit controls the driving unit to rotationally move the optical unit on the basis of the image of the reference object detected by the image detector so that the collected light is incident on the image pickup unit.

19. An apparatus comprising:
first and second reference object detecting devices, each comprising:
an optical unit including a collective lens which collects light from a moving reference object, and an image pickup unit which receives the collected light via the collective lens,
a driving unit which rotationally moves the optical unit about a reference point, and
a control unit which controls the driving unit to rotationally move the optical unit on the basis of a position where the collected light is received on the image pickup unit, wherein
the first and second reference object detecting devices are separated by a predetermined interval, and
the apparatus uses the first and second reference object detecting devices to measure three-dimensional coordinates of a center of a reference object based on the predetermined interval and an azimuth angle and an elevation angle measured by the first and second reference object detecting devices.

20. An apparatus comprising:
an optical unit including a collective lens which collects light from a reference object without any optical element having power arranged between the reference object and the collective lens, and an image pickup unit arranged at or near a rear focal position of the collective lens so that the collected light is received on the image pickup unit; and
a control unit which rotationally moves the optical unit, and thereby rotationally moves both the collective lens and the image pickup unit, on the basis of a position where the collected light is received on the image pickup unit.

21. An apparatus as in claim 20, wherein the collected light received on the image pickup unit is not an image of the reference object.

22. An apparatus as in claim 21, wherein:
the optical unit includes an additional image pickup unit which detects an image of the reference object, and
the control unit adjusts positioning of the optical unit in accordance with the detected image.

23. An apparatus comprising:
an optical unit including a collective lens which collects light from a reference object without any optical element having power arranged between the reference object and the collective lens, and an image pickup unit arranged at or near a rear focal position of the collective lens so that the collected light is received on the image pickup unit; and
means for rotationally moving the optical unit, and thereby rotationally moving both the collective lens and the image pickup unit, on the basis of a position where the collected light is received on the image pickup unit.

* * * * *